Patented June 7, 1932

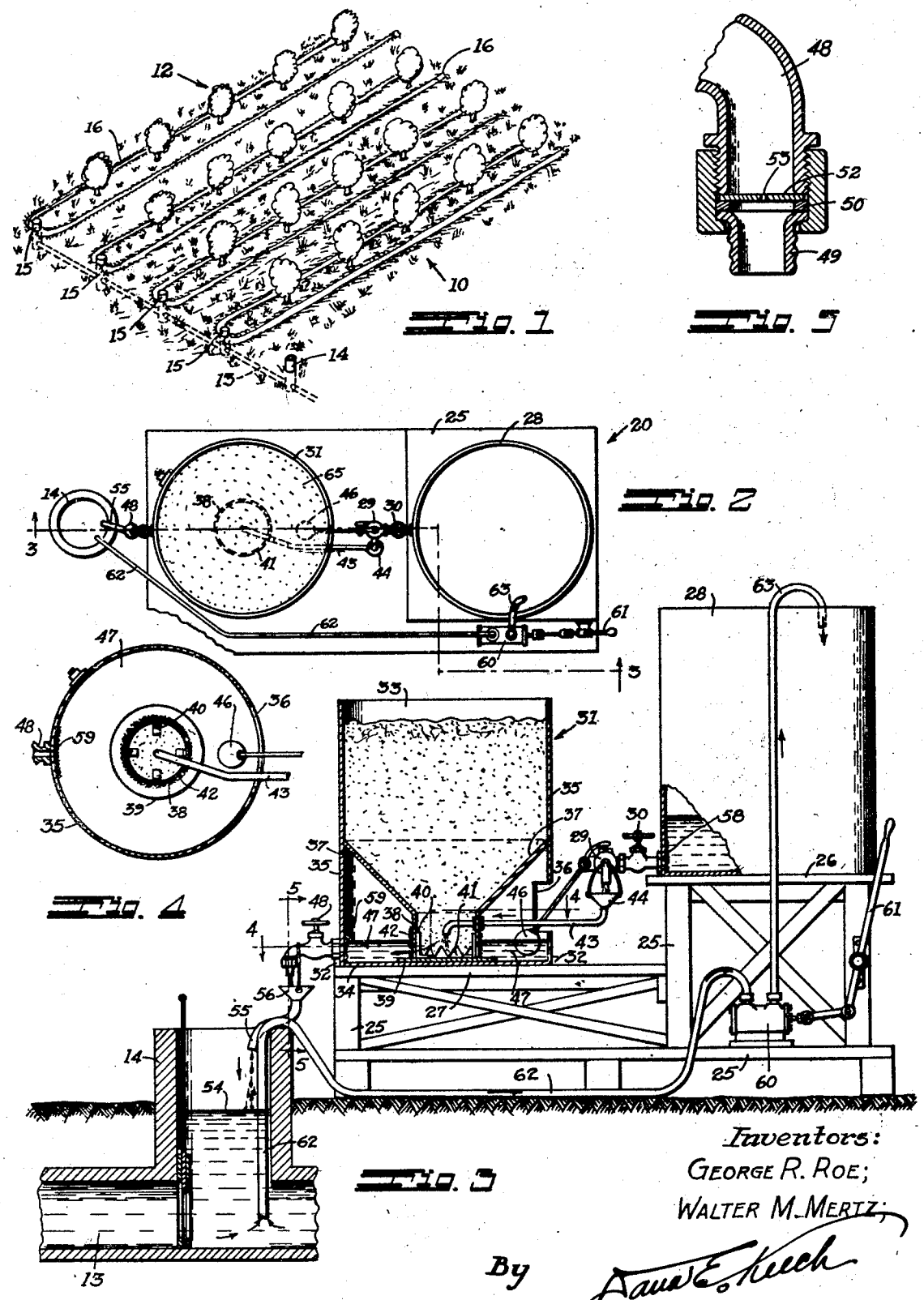

1,862,238

UNITED STATES PATENT OFFICE

GEORGE R. ROE, OF POMONA, AND WALTER M. MERTZ, OF ONTARIO, CALIFORNIA

FERTILIZER APPLICATOR

Application filed December 24, 1930. Serial No. 504,488.

Our invention relates to fertilizer applicators and more particularly to means for applying a soluble fertilizer to the soil through a gravity, furrow irrigation system.

Among available plant foods are a number of soluble fertilizers which, because of their solubility tend to "leach out" of the soil and become lost to the plants if not absorbed quickly by the latter. These fertilizers are accordingly more advantageously used when applied often but in small quantities and widely diffused. Means have been devised for accomplishing this through irrigation water.

Present irrigation practices are largely restricted to two methods: the old furrow system of running the water directly onto the land; and the overhead sprinkler system. The first mentioned method is still in general use, this probably being due, in a measure, to the expense of installing and operating the sprinkler system.

The complete control of the water as to pressure, flow, etc., in the sprinkler system makes it readily adaptable to serve the distribution of soluble fertilizer. In the open ditch system, however, the pressure and flow of water varies considerably and the only portable means provided to overcome this, prior to our invention, was a power driven feeding arrangement requiring an electric motor or a gasoline engine. This expedient rendered the applicator embodying it too costly for general use.

Accordingly, it is an object of our invention to provide a fertilizer applicator for operation with furrow irrigation systems which will be relatively inexpensive both in first cost and cost of operation.

A disability inherent in the more successful of previous applicators for furrow systems was the fact that the applicator had to be built into the water conduit delivering water to the system and hence could be used only with that one irrigating system.

Another object of our invention is to provide a fertilizer applicator for use with furrow irrigation systems which is a separate entity and is adapted to be transported from place to place and readily used in conjunction with any furrow irrigating system.

The manner of accomplishing the foregoing objects, as well as further objects and advantages will be made manifest in the following description, taken in connection with the accompanying drawing, in which:

Fig. 1 is a perspective view of an orchard diagrammatically illustrating a furrow system for irrigating this.

Fig. 2 is a plan view of a preferred embodiment of our fertilizer applicator as used in connection with the irrigating system shown in Fig. 1.

Fig. 3 is an enlarged vertical sectional view taken on the line 3—3 of Fig. 2.

Fig. 4 is a fragmentary horizontal sectional view taken on the line 4—4 of Fig. 3.

Fig. 5 is a fragmentary vertical sectional view taken on the line 5—5 of Fig. 3.

Referring specifically to the drawing, Fig. 1 shows an orchard 10 having rows of trees 11 which are adapted to be irrigated by a furrow irrigating system 12. While there are many different types of furrow and basin irrigating systems, we have shown herein for purposes of illustration only, a simple furrow system including an underground water supply pipe 13 having a stand pipe 14 which supplies water to the distributing stand pipes 15 from which the water is conducted along furrows 16 between the rows of trees 11.

The preferred embodiment of our invention illustrated herein consists in a fertilizer applicator 20 which is adapted to uniformly feed a saturated solution of soluble fertilizer in predetermined quantities to a stream of irrigating water flowing through the system 12 onto the orchard 10.

The fertilizer applicator 20 is adapted to be mounted on a truck or platform if not high enough to permit gravity flow into the stand pipe 14. It is light in weight and can be easily transported from one grove to another, thus eliminating the need and the expense of installing a fertilizer applicator in the irrigating system of each orchard. The applicator 20 includes a frame 25 providing a platform 26 and a platform 27, the latter being disposed to the left of and below the platform 26. Supported on the platform 26 is a water reservoir 28 having a float valve 29 connected with the lower end thereof. Disposed between the valve 29 and the tank 28 is a stop cock 30.

Resting on the platform 27 is a fertilizer hopper 31 which may be secured to the platform 27 or merely positioned thereon as by cleats 32.

The fertilizer hopper 31 has an outer shell or drum 33 which is open at the top and has a bottom 34, and cylindrical side walls 35. Formed in the lower half of the side wall 35 is an opening 36, the purpose of which will become evident hereinafter. Disposed in the drum 33 is a removable metal funnel 37 the upper end of which snugly slides in the drum 33, the lower end of this funnel forming a neck 38 which rests upon a plate 39 which is provided for the purpose of reinforcing the drum bottom 34. The lower edge of the neck 38 is reinforced by short legs 40 secured thereto which contact the plate 39 so as to assume most of the burden of supporting the funnel 37. The lower end of the neck 38 is formed to provide notches 41 which are covered by screen 42 extending about the lower end of the neck 38.

The neck 38 is provided with an aperture into which a pipe 43 extends, which is bent as shown in Figs. 3 and 4, the lower end of this pipe being disposed approximately in the middle of the funnel neck 38 and pointed downwardly. The upper end of the pipe 43 has a flared mouth 44 which is disposed directly below the valve 29.

The valve 29 is provided with a float 46 which extends through the opening 36 into the lower end of the drum 33 which forms a solution tank 47.

Provided in the drum wall 35 as shown in Fig. 3 is a control valve 48 which is preferably an ordinary garden faucet. This valve is adapted to receive a female hose coupling 49 having a rubber washer 50, there being a flow gauge trapped between the member 49 and the valve 48 which preferably consists of one of a series of disks 52 having a suitable flow aperture 53 formed therein. The size of this aperture determines the rate of flow of liquid through the valve 48.

A hose 55 provided with a funnel 56 on its upper end has a bail which is adapted to be hung over the valve 48 so that the flow of liquid from this valve into the funnel 56 is visible. With the apparatus properly positioned relative to the stand pipe 14 as shown in Fig. 3 the hose 55 extends into the stand pipe.

For the purpose of straining liquid passing from the reservoir 28 into the valves 30 and 29, a screen 58 is placed on the inside of the reservoir 28 opposite the outlet therefrom. The valve 48 is also provided with a screen 59 as shown in Figs. 3 and 4.

Provided on the frame 25 is a hand pump 60 which is manually operated by a handle 61 and which is adapted to draw water from the stand pipe 14 as through a suction hose 62 and discharge this through a pipe or hose 63 into the reservoir 28.

The operation of our invention is as follows:

The furrow system 12 having been prepared for irrigating the orchard 10 and water supplied to the stand pipe 14 through the underground supply pipe 13, the frame 25 with equipment is set up adjacent to the stand pipe 14. To begin with, the cock 30 and the feed valve 48 are closed and the hose 62 is extended into the stand pipe beneath the surface of the water 54. The handle 61 is now manipulated by the irrigator until the reservoir 28 is filled with water. Then the fertilizer hopper 31 is filled with the dry fertilizer material. The stop cock 30 is now opened and water flows freely from the reservoir through the float valve and into the pipe 43 which delivers this into the lower end of the body of fertilizer 65 in the fertilizer hopper 31. This flow of water into the fertilizer makes a saturated solution which flows out through the openings 41 and the screen 42 into the solution tank 47 and as the level increases, raises the float 46 to shut off the float valve 29. The tube 55 is now placed in the stand pipe 14 and the valve 48 is turned on to permit a regulated flow of solution from the tank 47 into the irrigating water in the stand pipe 14. The amount of this flow which is necessary to feed a certain number of pounds of fertilizer per hour may be regulated by the disks 52 with openings of predetermined size so that the amount of fertilizer fed into the irrigating water can be easily determined by the irrigator whether or not he has had experience with this type of apparatus. We have found in practice that our apparatus may be satisfactorily used in the average rate of flow of irrigating water to operate without attention for a number of hours, which makes it possible for a farmer to fill the reservoir 28 with water and the hopper 31 with fertilizer at infrequent intervals thus permitting him to spend most of the time in regulating the irrigation water.

When the end of an irrigating run is approached the stop cock 30 is turned off and the solution in the solution tank 47 allowed to gradually drain out through the valve 48. Thus all solution which back washes into the fertilizer hopper funnel neck 38 is drained therefrom. The fertilizer applicator 20 of our invention may be easily disassembled so that one man may assemble these on a truck or platform if this is necessary in order to have the outlet elevated high enough to feed the saturated solution by gravity into the irrigation water.

It is, of course, an important feature of our invention that the liquid from the reservoir tank 28 is delivered to the valve 48 at a constant pressure regardless of the height of the liquid in the tank 28. In the present embodiment, this is accomplished by the float valve 29 which responds to the float 46 so as to maintain the level of liquid in the drum 33 substantially uniform. Thus, the drum 33 may be considered as a control tank. It is accordingly to be noted that the apparatus of our invention could be used to secure a regulated flow of liquid fertilizer or other chemical into the stand pipe 14 even though it was not desired to dissolve dry chemical in the drum 33. To accomplish this, the tank 28 would merely be filled with the liquid it is desired to feed, the valve 30 would be turned on, and the valve 48 would be adjusted to feed at a given rate. In other words, the apparatus of our invention is adapted for the regulated feeding of a liquid into an irrigating system whether or not it is desired to form a certain solution of chemical in that liquid during its passage through the apparatus.

While we have shown and described but a single form of our invention, it is understood that various changes and modifications may be made in this without departing from the spirit of the invention or the scope of the appended claims.

What we claim is:

1. In a fertilizer applicator, the combination of: a water reservoir; a float valve connecting with said reservoir; a fertilizer hopper, the lower end of which extends below said valve; a solution sump connected with a lower portion of said hopper; means for causing water released from said valve to be discharged in the lower end of said hopper; a float extending into said solution for operating said valve; and a feed control valve for feeding solution from said tank into an irrigation system.

2. In a fertilizer applicator, the combination of: a water reservoir; a fertilizer hopper; a solution tank; means for conducting water from said reservoir into a body of fertilizer in said hopper by gravity; means for conducting the solution thus formed into said tank by gravity; means for dispensing said solution into an irrigation system by gravity; and means for replenishing the water in said reservoir from said irrigation system.

3. In a fertilizer applicator, the combination of: a water reservoir; a fertilizer hopper; a solution tank; means for conducting water from said reservoir into a body of fertilizer in said hopper by gravity; means for conducting the solution thus formed into said tank by gravity; means for maintaining said solution at a given level; means for dispensing said solution into an irrigation system by gravity; and means for replenishing the water in said reservoir from said irrigation system.

4. In a fertilizer applicator, the combination of: a water reservoir; a fertilizer hopper; a solution tank; means for conducting water from said reservoir into a body of fertilizer in said hopper by gravity; means for conducting the solution thus formed into said tank by gravity; means for dispensing said solution into an irrigation system by gravity at a uniform rate of flow; and means for replenishing the water in said reservoir from said irrigation system.

5. In a fertilizer applicator, the combination of: a water reservoir; a fertilizer hopper; a solution tank; means for conducting water from said reservoir into a body of fertilizer in said hopper by gravity; means for conducting the solution thus formed into said tank by gravity; means for maintaining said solution at a given level; means for dispensing said solution into an irrigation system by gravity at a uniform rate of flow less than the maximum flow of said means for conducting water from said reservoir; and means for replenishing the water in said reservoir from said irrigation system.

6. A combination as in claim 1 in which the solution in said tank backwashes into said hopper.

7. A combination as in claim 2 in which the solution in said tank backwashes into said hopper.

8. A combination as in claim 3 in which the solution in said tank backwashes into said hopper.

9. A combination as in claim 5 in which the solution in said tank backwashes into said hopper.

10. A combination as in claim 2 in which said water replenishing means consists in a manually operable pump.

11. In a fertilizer applicator, the combination of: a water reservoir; a float valve connected with the lower end of said reservoir; a fertilizer hopper the lower end of which extends below said valve; a solution tank formed on said hopper, there being openings connecting the lower end of said hopper with said tank; an arm extending from said valve; a float on said arm and resting on the solution in said tank; a pipe passing through a wall of said hopper beneath said valve; means on the outer end of said pipe for receiving water from said valve so that said water will be discharged by gravity from the inner end of said pipe; and a valved conduit leading from said solution tank for feeding solution at a uniform rate into an irrigation system.

12. In a fertilizer applicator, the combination of: a water reservoir; a float valve connected with the lower end of said reservoir; a fertilizer hopper the lower end of which extends below said valve; a solution tank formed on said hopper, there being openings connecting the lower end of said hopper with said tank; an arm extending from said valve;

a float on said arm and resting on the solution in said tank; a pipe passing through a wall of said hopper beneath said valve; means on the outer end of said pipe for receiving water from said valve so that said water will be discharged by gravity from the inner end of said pipe; a valved conduit leading from said solution tank for feeding solution at a uniform rate into an irrigation system; and a hand pump for lifting water from said irrigation system into said reservoir.

13. In a fertilizer applicator, the combination of: a fertilizer hopper including a shell having a solution sump in the lower portion thereof; a false bottom disposed in said shell for supporting a quantity of chemical fertilizer disposed therein; a foraminous wall formed on said false bottom and extending into said sump; means for discharging water into fertilizer contained in said hopper so that said water will filter through said fertilizer and said foraminous wall into said sump; and means for dispensing solution in a uniform flow from said sump by gravity.

14. In a fertilizer applicator, the combination of: a fertilizer hopper including a shell having a solution sump in the lower portion thereof; a funnel shaped false bottom disposed in said shell for supporting a quantity of chemical fertilizer disposed therein; a foraminous wall formed on said false bottom and extending into said sump; means for discharging water into fertilizer contained in said hopper so that said water will filter through said fertilizer and said foraminous wall into said sump; means for regulating said flow of water into said hopper to maintain the level of solution in said sump at a given height; and means for dispensing solution in a uniform flow from said sump by gravity.

15. In a fertilizer applicator, the combination of: a fertilizer hopper including a shell having a solution sump in the lower portion thereof; a false bottom disposed in said shell for supporting a quantity of chemical fertilizer therein; a foraminous wall formed on said false bottom and extending into said sump, said wall being removable from said shell for cleaning said sump; means for discharging water into fertilizer contained in said hopper so that said water will filter through said fertilizer and said foraminous wall into said sump; and means for dispensing solution in a uniform flow from said sump by gravity.

16. In a fertilizer applicator, the combination of: a fertilizer hopper including a shell having a solution sump in the lower portion thereof; a funnel shaped false bottom disposed in said shell for supporting a quantity of chemical fertilizer disposed therein; a foraminous wall formed on said false bottom and extending into said sump, said wall being removable from said shell for cleaning said sump; means for discharging water into fertilizer contained in said hopper so that said water will filter through said fertilizer and said foraminous wall into said sump; means for regulating said flow of water into said hopper to maintain the level of solution in said sump at a given height; and means for dispensing solution in a uniform flow from said sump by gravity.

17. In a fertilizer applicator, the combination of: a fertilizer hopper including a shell having a solution sump in the lower portion thereof, there being an opening in said shell to provide access to said sump; a false bottom disposed in said shell for supporting a quantity of chemical fertilizer disposed therein; a foraminous wall formed on said false bottom and extending into said sump; means for discharging water into fertilizer contained in said hopper so that said water will filter through said fertilizer and said foraminous wall into said sump; and means for dispensing solution in a uniform flow from said sump by gravity.

18. In a fertilizer applicator, the combination of: a fertilizer hopper including a substantially cylindrical shell open at the top and provided with a bottom, there being an opening in said shell to give access to the lower portion thereof; a funnel shaped false bottom removably disposed in said shell having a central neck provided with a series of openings in the lower end thereof, said lower end of said false bottom being adapted to rest upon the bottom of said shell; screen means for straining fluid flowing into said openings in said neck; means for discharging water into the lower part of a body of fertilizer supported by said false bottom in said shell; means for discharging solution from the bottom of said shell by gravity at a uniform rate of flow; and means for regulating the flow of water into said fertilizer so as to maintain the solution in the lower end of said shell at a predetermined height.

19. In a fertilizer applicator, the combination of: a container for solid soluble chemical; a reservoir for water disposed above the bottom of said container; water conduit means for conducting water from said reservoir into said container to form a solution of said chemical, there being an opening in a bottom portion of said container to facilitate delivering said solution by gravity to an irrigating system; and means to regulate the amount of water flowing through said water conduit means.

20. A combination as in claim 19 in which said water is discharged into the chemical in said container an appreciable distance above the bottom of said container.

21. In a fertilizer applicator, the combination of: a container for solid soluble chemical; a reservoir for water disposed above the bottom of said container; water conduit means for conducting water from said reservoir into said container to form a solution of said chemical, there being an opening in a bottom portion of said container to facilitate delivering said solution by gravity to an irrigating system; and means to automatically regulate the amount of water flowing through said water conduit means.

22. In a fertilizer applicator, the combination of: means for receiving a quantity of soluble solid chemical fertilizer; means for causing a regulated flow of water by gravity through a bottom portion of said chemical to form a solution; and means for discharging said solution into an irrigating system by gravity.

23. In a chemical applicator, the combination of: a liquid reservoir tank; a control tank; means for feeding liquid from said reservoir tank to said control tank by gravity to maintain a predetermined level of liquid in said control tank; and means for dispensing liquid by gravity from said control tank at a predetermined rate of flow into an irrigating system, said liquid being adapted to convey a soluble chemical into said system at a rate proportional to said rate of flow.

24. In a chemical applicator, the combination of: a liquid reservoir tank; a control tank; float valve means for feeding liquid from said reservoir tank to said control tank by gravity to maintain a predetermined level of liquid in said control tank; and valve means for dispensing liquid by gravity from said control tank at a predetermined rate of flow into an irrigating system, said liquid being adapted to convey a soluble chemical into said system at a rate proportional to said rate of flow.

25. In a chemical applicator, the combination of: a liquid reservoir tank; a control tank; means for feeding liquid from said reservoir tank into said control tank to maintain liquid at a given point in said control tank at substantially a constant pressure; and means for dispensing liquid from said point in said control tank at a predetermined rate of flow into an irrigating system.

In testimony whereof, we have hereunto set our hands at Ontario, California, this 15th day of December, 1930.

GEORGE R. ROE.
WALTER M. MERTZ.